(12) United States Patent
Freudendahl

(10) Patent No.: US 7,156,119 B2
(45) Date of Patent: Jan. 2, 2007

(54) HYDRANT KNOCK-OFF COMBINATION FLOW STOP AND BACKFLOW CHECK VALVE

(76) Inventor: Erling A. Freudendahl, Bizonvej 3, Galten (DK)

( * ) Notice: Subject to any disclaimer, the term of this patent is extended or adjusted under 35 U.S.C. 154(b) by 351 days.

(21) Appl. No.: 10/758,110

(22) Filed: Jan. 16, 2004

(65) Prior Publication Data

US 2005/0155645 A1 Jul. 21, 2005

(51) Int. Cl.
*F16K 17/40* (2006.01)
*E03B 9/02* (2006.01)

(52) U.S. Cl. ............ 137/68.14; 137/71; 137/300
(58) Field of Classification Search ............ 137/68.14, 137/71, 285, 300, 797
See application file for complete search history.

(56) References Cited

U.S. PATENT DOCUMENTS

| | | | |
|---|---|---|---|
| 22,927 A | 2/1859 | Barthalomew | |
| 164,149 A * | 6/1875 | Cregier | 137/300 |
| 208,072 A | 9/1878 | Carr | |
| 349,230 A | 9/1886 | Mead | |
| 2,054,561 A * | 9/1936 | Greenberg | 137/68.14 |
| 2,980,125 A * | 4/1961 | Grant et al. | 137/68.14 |
| 3,104,554 A * | 9/1963 | Mueller et al. | 137/68.14 |
| 3,586,019 A * | 6/1971 | Thomas et al. | 137/68.14 |
| 4,127,142 A | 11/1978 | Snider | |
| 4,596,263 A * | 6/1986 | Snider | 137/68.14 |
| 5,609,179 A * | 3/1997 | Knapp | 137/68.16 |
| 5,941,268 A | 8/1999 | Ross, Jr. | |
| 6,401,745 B1 * | 6/2002 | Corder | 137/300 |
| 2003/0150486 A1 | 8/2003 | Liebert | |

FOREIGN PATENT DOCUMENTS

EP 1010824 6/2000

* cited by examiner

*Primary Examiner*—John Rivell
(74) *Attorney, Agent, or Firm*—Richard C. Litman

(57) ABSTRACT

A hydrant knock-off combination flow stop valve and backflow check valve, mountable between water system riser and a wet-type hydrant having a breakaway flange ring. The vertical valve has a bulbous, cylindrical outer wall having an upper flange connecting to a wet-type hydrant by a break ring and a lower flange connecting to a system riser pipe. One embodiment has radial vertical vanes defining a central cylinder coaxial with the valve and acting as guides for a movable valve element to travel vertically up and down. The lower flange a seat, acting as a check valve with the valve element. The valve has a restraining cage keeping the valve element from engaging an upper seat. Once the break ring is ruptured the valve element seals against the seat, stopping water flow. The preferred valve element is a plastic coated ball. Another embodiment has a double mushroom, spring loaded valve element.

19 Claims, 15 Drawing Sheets

HYDRANT KNOCK-OFF COMBINATION FLOW STOP AND BACKFLOW CHECK VALVE

BACKGROUND OF THE INVENTION

1. Field of the Invention

The present invention relates to valves. More particularly, the present invention relates to valves useful with hydrants such as fire hydrants which prevent water loss, in case of accidental breaking away of the hydrant, and backflow into the water system.

2. Description of the Related Art

Hydrants such as fire hydrants are particularly susceptible to being broken away from their water supply system due to vehicle collisions due to their proximity to city streets as commonly installed. Upon the hydrant breaking away, a large flow of water would be released from the water system if left unchecked. In a wet barrel hydrant, useful in mild climates, the hydrant is kept at water system pressure. It is known to provide a breakaway connection with a water system riser such as a breakaway flange ring or a breakaway riser, allowing the hydrant to break away from the water system riser upon collision, thus minimizing the overall damage to the water system. It is also known to provide valves, such as flap valves between the breakaway flange or breakaway riser and the water system riser which stop the uncontrolled flow of water from the system upon collision. In some cases, backflow from the hydrant or broken off flange or breakaway riser can take place, allowing contaminated water to enter the water supply system. It would be desirable to provide a valve which is simple in design and mountable between a water system riser and a hydrant having a breakaway flange ring or riser, the valve acting as a stop valve to prevent uncontrolled flow of system water from the broken hydrant system while acting as a check valve to prevent backflow of contaminated water into the water system riser.

U.S. Patent Publication No. 2003/0150486 A1, published Aug. 14, 2003, for Liebert, describes a breakaway safety shut-off valve for use with a tank for flammable liquids or dangerous chemicals having an upwardly spring-biased ball which is separated from a shutoff seat by arm segments to maintain the ball valve in an open position during normal use of the safety valve. Upon the breaking away of the safety valve at a weakened break-off point such as by accident or sabotage, the arm segments disengage an annular shoulder, allowing the spring-biased ball to shut against the seat, thereby closing the broken valve.

U.S. Pat. No. 22,927, issued Feb. 15, 1859, to Bartholomew, describes a hydrant with a lower ball valve in a curved standpipe.

U.S. Pat. No. 208,072, issued Sep. 17, 1878, describes a hydrant having a ball valve W.

U.S. Pat. No. 349,230, issued Sep. 14, 1886, to Mead, describes a hydrant having a supplemental twist-open valve for allowing system water to enter a hydrant from a riser.

U.S. Pat. No. 4,127,142, issued Nov. 28, 1978, to Snider, describes a flap type check valve connected between a riser pipe and wet barrel hydrant, the connection with the hydrant being a breakaway flange connection. Upon rupture of a breakaway flange connection, the check valve is allowed to close, stopping uncontrolled flow of water from the broken hydrant system.

U.S. Pat. No. 5,941,268, issued Aug. 24, 1999, to Ross, Jr., describes a knock-off tank safety valve employing a spring-loaded mushroom valve which closes when the safety valve is broken away.

European Patent No. EP1010824, published Jun. 21, 2000, describes a hydrant having a bulbous ball check valve located between the hydrant and a riser pipe having a vertically traveling ball guided by guide rods between upper and lower seats.

None of the above inventions and patents, taken either singly or in combination, is seen to describe the instant invention as claimed. Thus, a hydrant knock-off flow stop valve solving the aforementioned problems is desired.

SUMMARY OF THE INVENTION

The present invention is a valve which is mountable between a water system riser and a hydrant having a breakaway flange ring or riser, the valve acting as a stop valve to prevents uncontrolled flow of system water from the broken hydrant system while acting as a check valve to prevent backflow of contaminated water into the water system riser. The vertically oriented valve body is in the shape of a bulbous cylinder having an upper flange for connection with the lower flange of a wet-type hydrant by means of a break ring. The valve has a lower flange for connection with a water system riser pipe. One embodiment of the invention features radial vanes spaced around the interior of the bulbous valve wall, the vanes defining a central cylinder coaxial with the valve and acting as guides for a movable valve element to travel vertically up and down.

The lower flange defines an inner seat which acts as a check valve with the valve element when engaged, preventing backflow of contaminated water into the riser of the water system. The valve element is lifted upward with flow of water through the valve and into the open hydrant, and its travel is stopped by a restraining cage extending downward from the upper valve flange. The restraining cage has a lower seat connected with an upper ring by spaced legs. The restraining cage is held by the upper ring in the upper valve flange by the lower flange of the hydrant as connected by the break ring. Upon the break ring being sheared or ruptured, the hydrant flange pulls away, allowing the restraining cage to lift off and away from the upper valve flange, thereby allowing the force of water flow to raise the valve element to engage an upper circumferential seal directly beneath the upper flange on the interior of the bulbous valve wall, thus acting as a flow stop valve.

During normal operation of the hydrant, such as providing water to a fire hose, water flows upward from a riser, between the spaced vanes, through the legs of the restraining cage, and upward through the upper flange and into the hydrant. The preferred movable valve element is a ball or globe, preferably of hollow cast iron and having a soft plastic coating.

An alternative embodiment substitutes a double ended, mushroom type movable valve element which has an upper mushroom shape element for engaging the upper seal for water stop flow and a lower, inverted mushroom shape element for engaging the lower seal acting as a check valve. The stems of the mushroom elements extend toward a central plate along a common axial support upon which they are slidingly mounted, coil springs providing separation force such that during normal operation water pressure lifts the lower mushroom element while the upper mushroom element is restrained from upward travel by the restraining cage. Any backflow is checked by the lower mushroom element engaging the lower seal.

Another embodiment provides a double ended, mushroom type valve element which is held between mushroom stems by a spider structure having a hub supporting the axial support and radially spaced spokes extending to an outer ring held at about the elevational center of the valve. The outer ring may be held between half-grooves of connecting flanges of a split case flange connection. This embodiment operates similarly to the vane guided free double mushroom valve element described above.

The invention provides improved elements and arrangements thereof for the functions described which are inexpensive, dependable and fully effective in accomplishing its intended purposes.

The novel and important aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a valve which is simple in design and mountable between a water system riser and a hydrant having a breakaway flange ring or riser, the valve acting as a stop flow valve to prevent uncontrolled flow of system water from the broken hydrant system while acting as a check valve to prevent backflow of contaminated water into the water system riser.

Figure 1A:
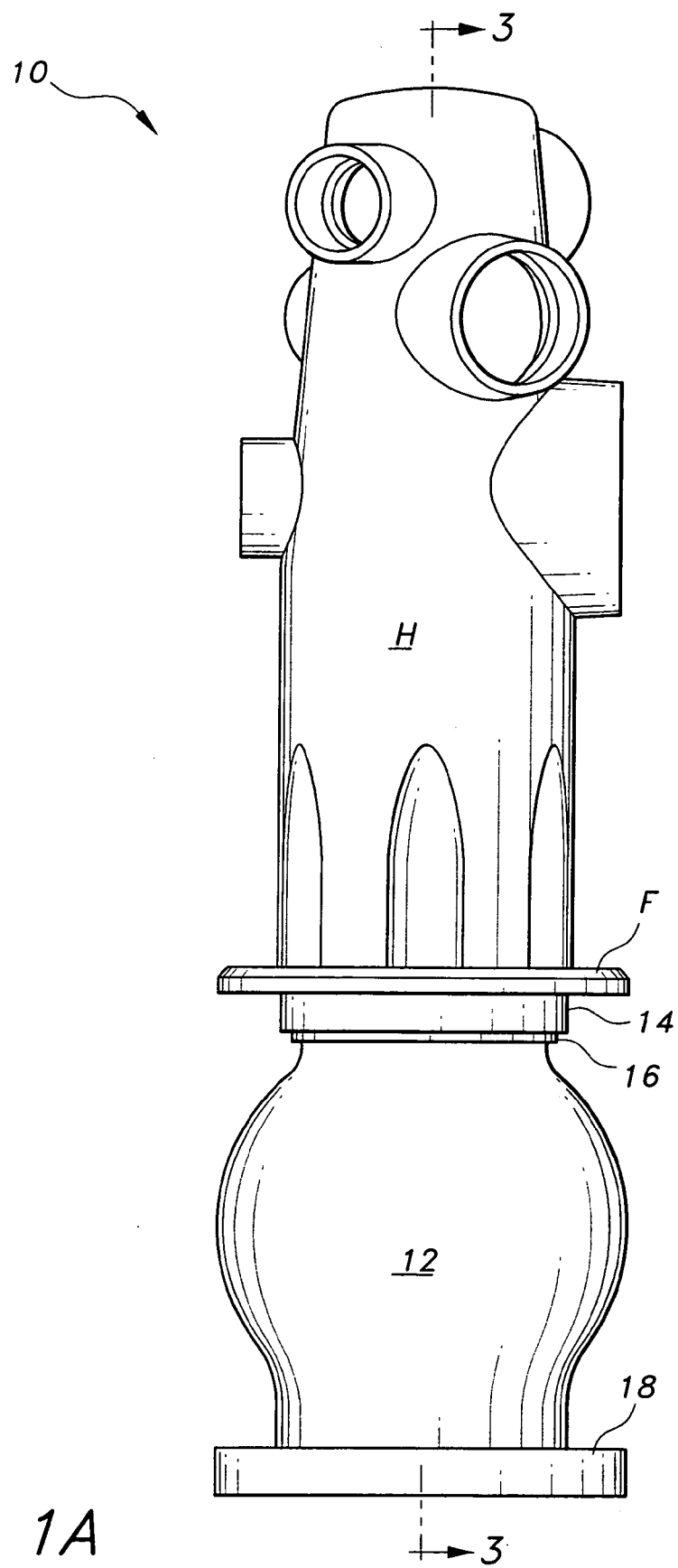
FIG. 1A is an elevation view of a wet hydrant connected with a knock-off flow stop valve according to the present invention.
Figure 1B:
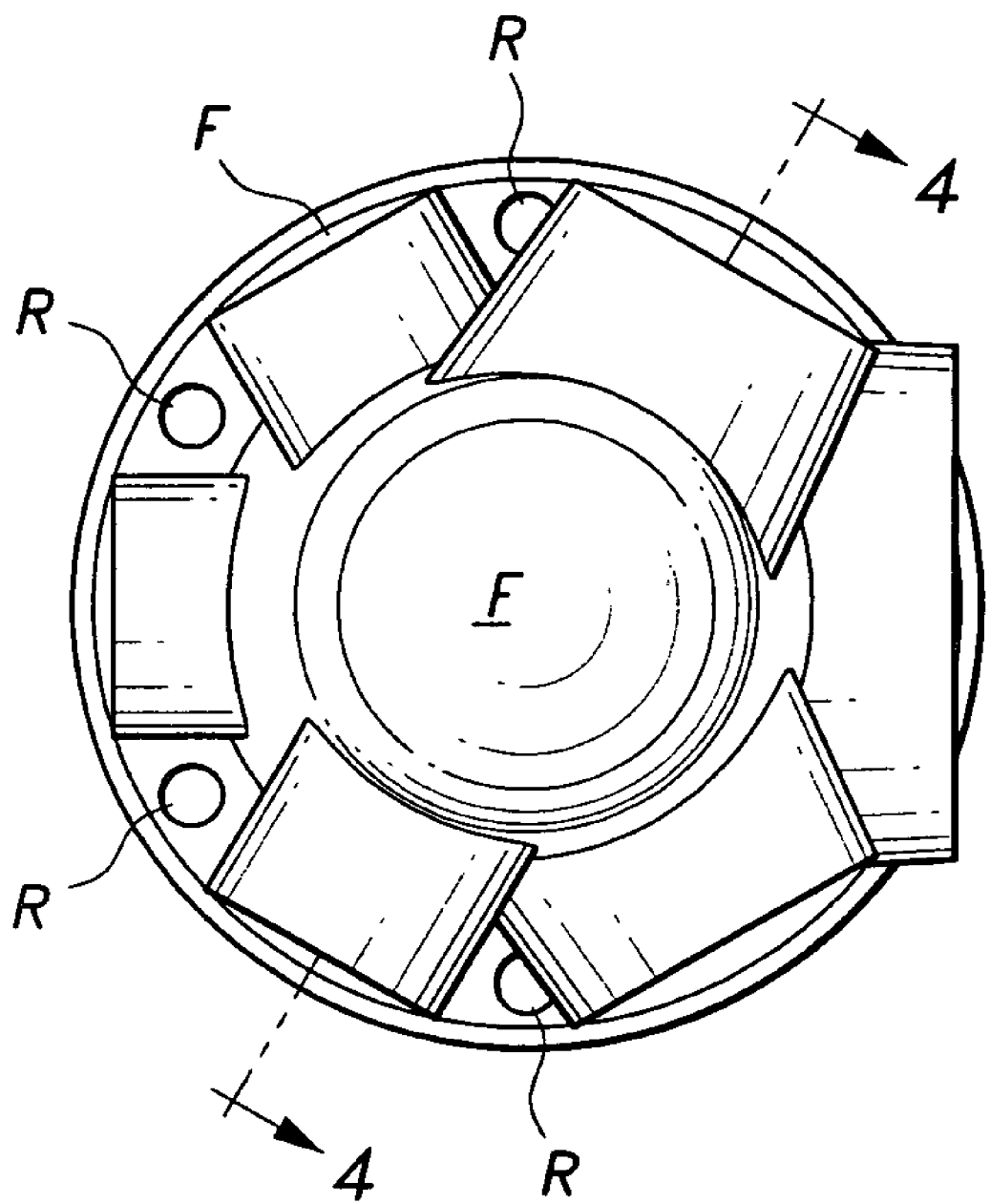
FIG. 1B is a plan view of the wet hydrant of FIG. 1A.
Figure 2:
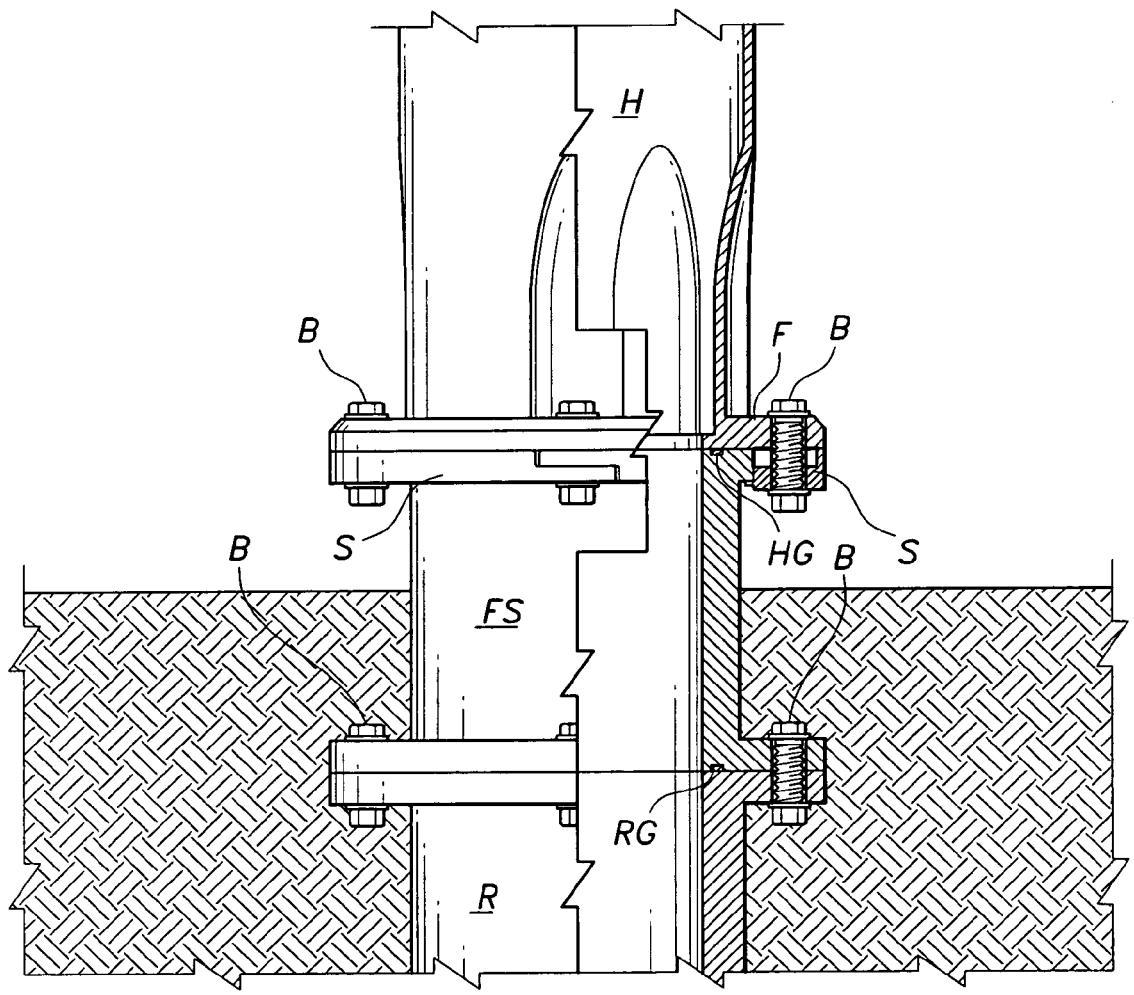
FIG. 2 is a partially broken away elevation view of an existing knock-off wet hydrant as attached by a break ring to a water system riser pipe by means of a flange section.

Referring to FIGS. 1A, 1B, and 2, there is shown a wet hydrant combination flow stop and backflow check valve system 10. System 10 includes a wet hydrant H, i.e., a hydrant filled with water under unused conditions, having a lower flange F for connection with a conventional city water supply system (not shown). System 10 includes a bulbous, cylindrical valve 12 having an upper flange 14 for connection with flange F by a shear break ring S and breakaway bolts B, upper flange 14 having a recess 16 receiving the lower edge of shear break ring S for mounting hydrant H to valve 12. Valve 12 has a lower flange 18 for connection to a water system riser R (see FIG. 2). FIG. 2 shows a partially broken away, environmental elevation view of a known breakaway wet hydrant system where hydrant H is attached to flange section FS by a shear break ring S by bolts B through bores R (see FIG. 1B). Flange section FS is, in turn, attached to riser R from a water system at mating flanges held by bolts B. Flange section FS has circumferential hydrant and riser flange gaskets HG and RG, respectively, for sealing against leaks in a known manner. In a preferred embodiment, valve 12 is similarly configured to flange section FS so as to be substituted therefor in the hydrant system 10. For the interests of clarity, flange gaskets or seals corresponding to gaskets HG and RG and the riser R are not shown in the Figures illustrating the installation of the inventive valve 12, but would ordinarily be included in the actual installation.

Referring to FIGS. 3–6, there are shown sectional views of a first embodiment of the inventive valve in a normal flow configuration, a rotated normal flow configuration, a backflow check position, and a partially exploded flow stop position, respectively. Valve 12 has a body having a vertically oriented, generally cylindrical, bulbous, outer wall 20 having an upper flange 14 which defines a flange recess 16 for connection with a hydrant flange F by means of a shear break ring S and bolts B through receiving bores R (See FIG. 2). All embodiments of the inventive valve employ the hydrant connection and riser pipe or similar water system element as shown in FIG. 2 and are not shown or described in the remaining drawings. Outer wall 20 forms a circumferential upper valve seat 22 at its upper neck. The lower end of outer wall 20 mates with a circumferential lower valve seat ring 24 forming a lower valve seat 26 and held in place by the riser flange (see FIG. 2).

Vanes 28 extend radially inward from the bulbous portion of outer wall 20 and extend vertically so as to form a cylindrical vertical valve member guide defined by vertical vane valve guides 30. There are preferably four vanes 28 in valve 12, but three or more vanes may be provided as desired. The water may flow around ball valve element 32 and between vanes 28 in the bulbous portion of the valve 12 when the ball valve element is in a position between upper valve seat 22 and lower valve seat 26.

Figure 3:
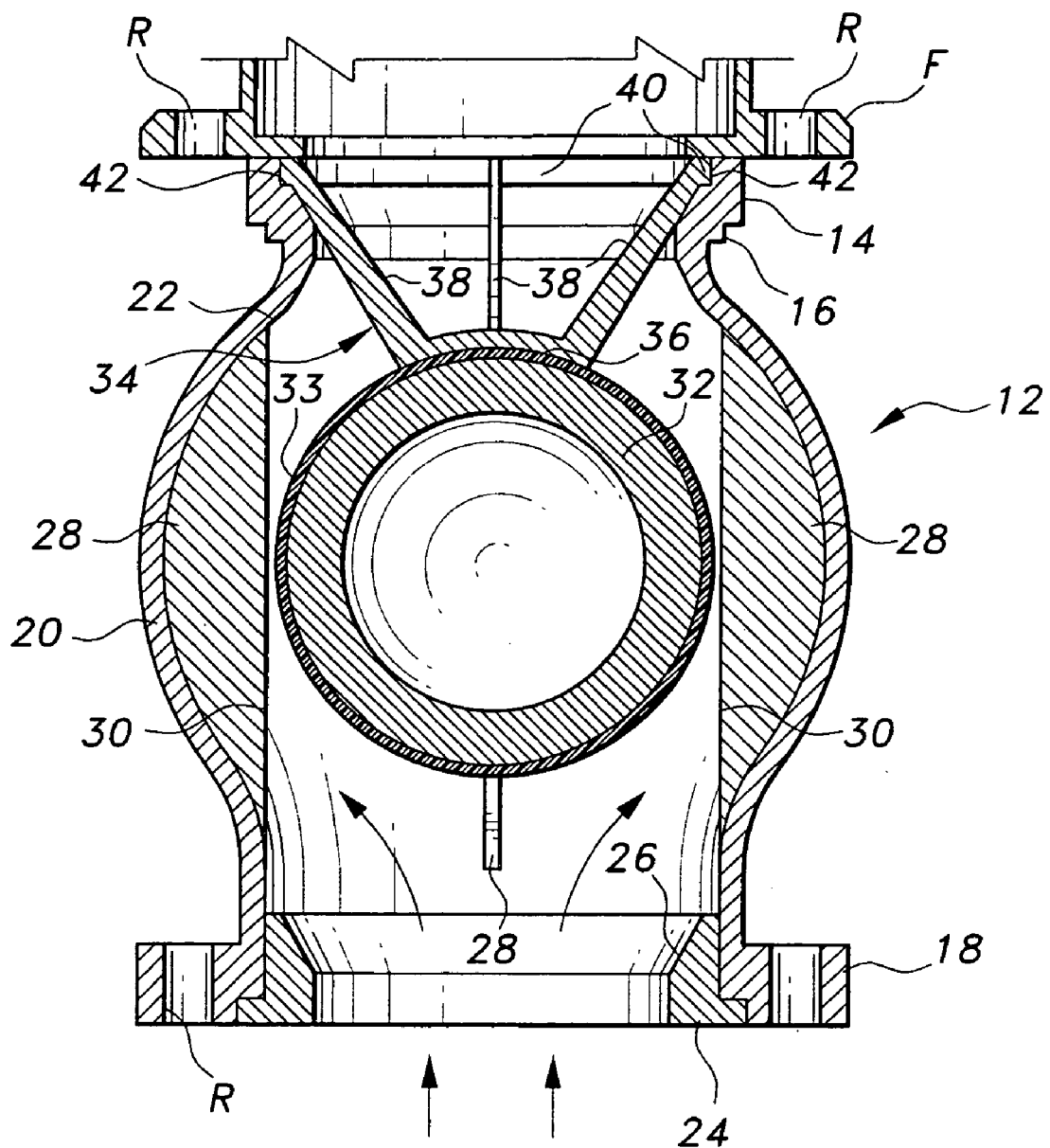
FIG. 3 is a partial section view taken along line 3—3 of FIG. 1A.
Figure 4:
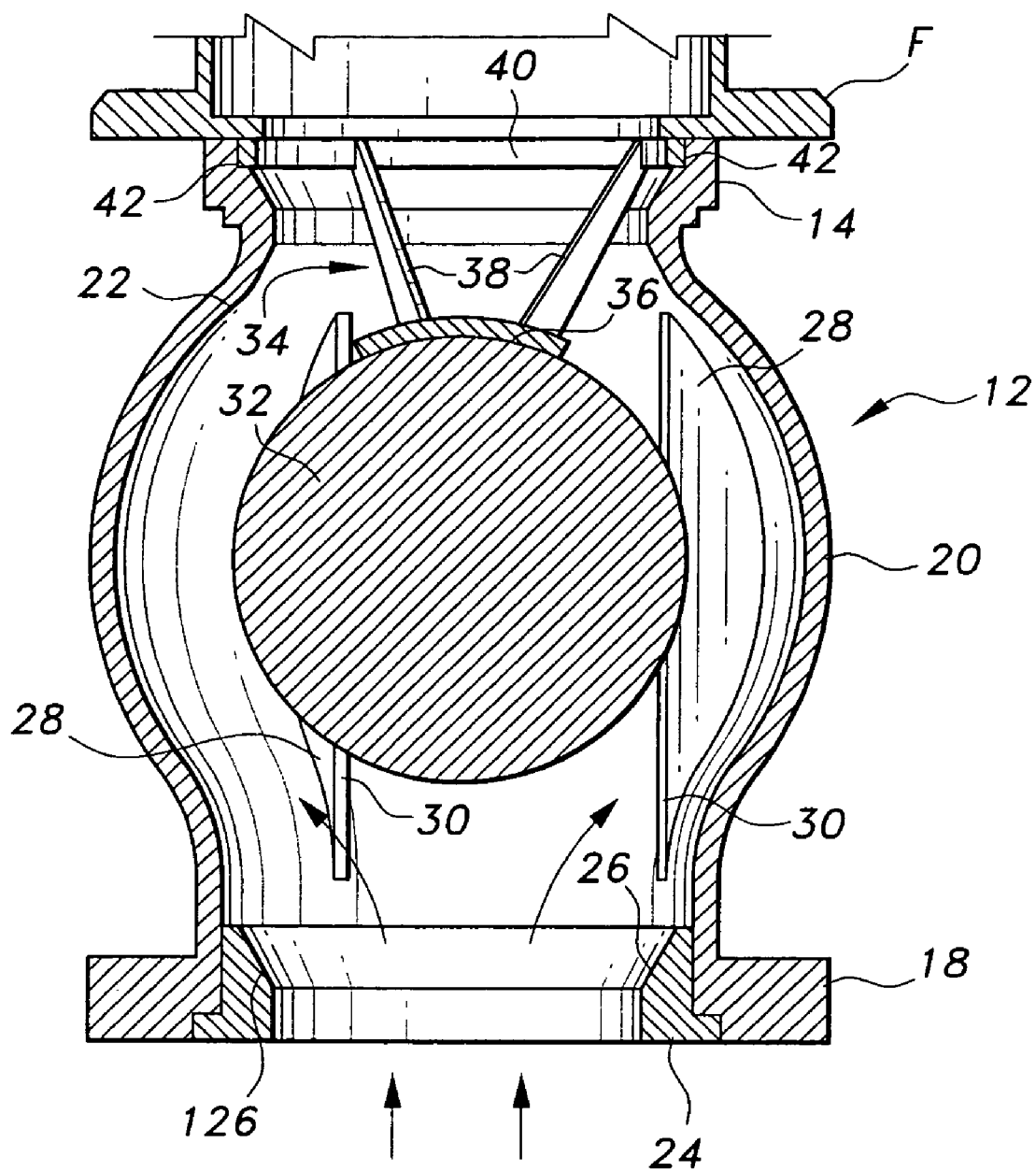
FIG. 4 is a partial section view taken along line 4—4 of FIG. 1B.
Figure 5:
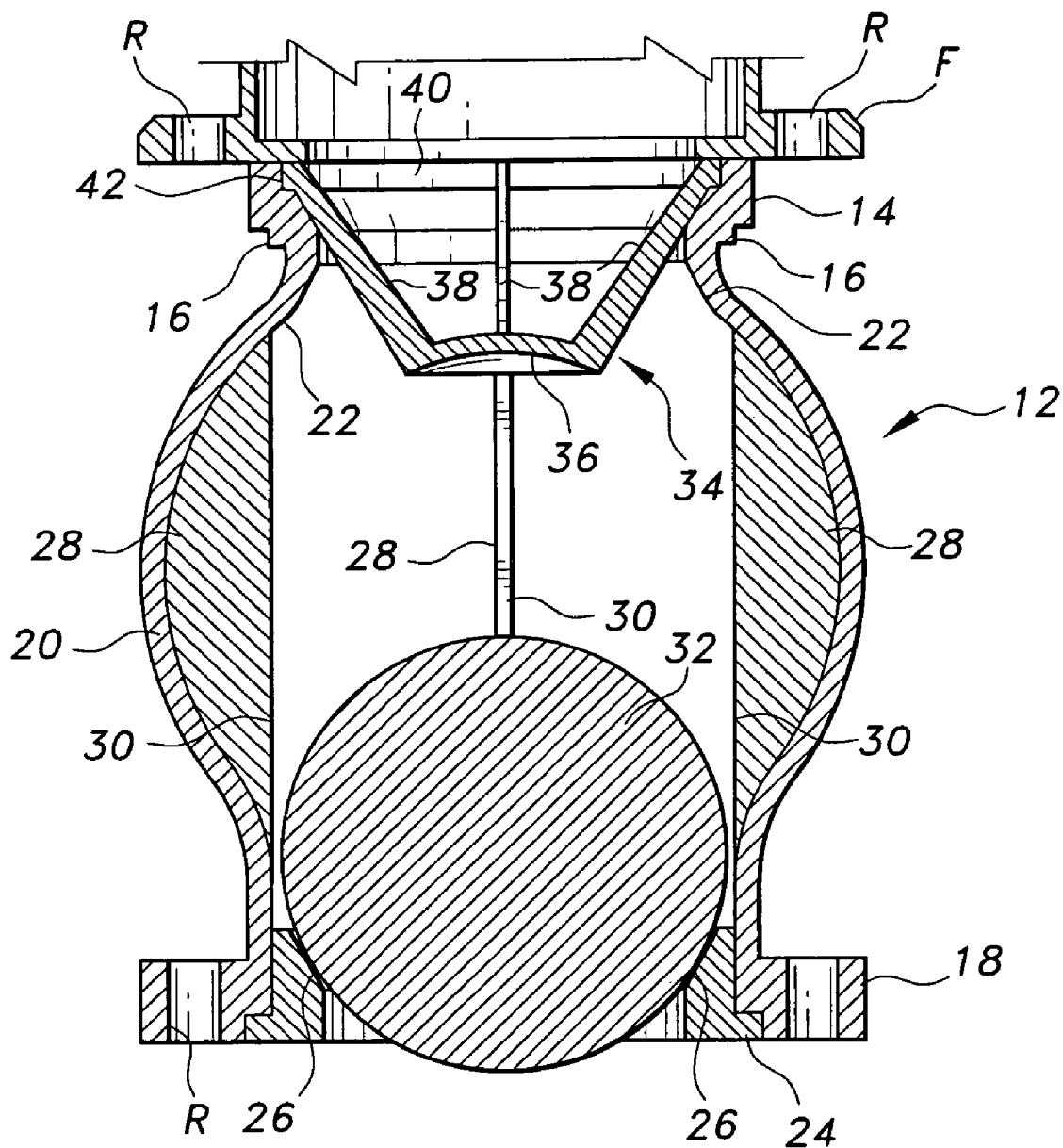
FIG. 5 is a section view as in FIG. 3 with the ball valve shut-off element in a steady state and backflow check position.

The ball valve element 32 is more dense than water so as to naturally sink under static water conditions. As shown in FIG. 3, the ball valve element 32 is preferably a hollow globe having an outer covering 33 of relatively soft plastic or polymeric material to enhance sealing against seats 22 or 26. Other Figures show ball valve element 32 as solid metal or plastic. A valve ball restraining cage 34 is located in the upper portion of valve 12 having a centrally located concave ball seat 36 having a surface shaped to conform to the ball valve element 32 so as to restrain ball 32 during upward water flow to hydrant H during use. Cage 34 preferably has at least three cage legs 38 radiating upwardly and outwardly, joining with a circumferential cage retaining ring 40 which fits into an upward opening cage retaining ring groove 42 in the upper, inner side of valve upper flange 14. Cage 34 is held in place in groove 42 by flange F when hydrant H is in place. Cage legs 38 extend upward and outward, extending along the inner wall of upper flange 42 as it flares upward and outward, thereby partially supporting cage legs 38. Legs 38 space cage ball seat 36 and, thereby, ball valve element 32 from upper seat 22, thus, allowing flow of water upward between vanes 28 and through cage legs 38 to the hydrant H when water is supplied to hydrant H.

Figure 6:
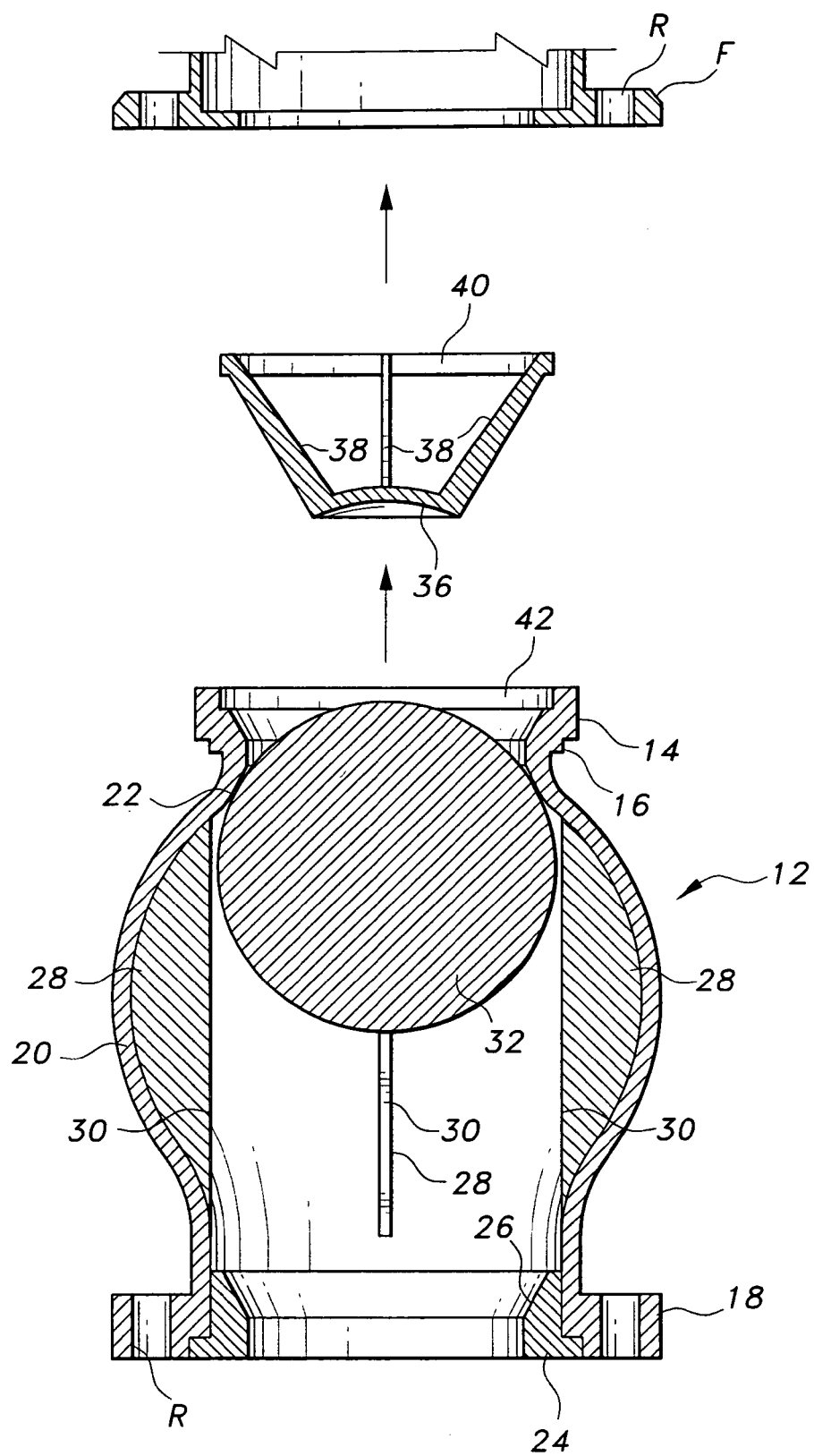
FIG. 6 is a partially exploded section view as in FIG. 3 with the ball valve element in a stop flow position.

As illustrated in FIG. 6, upon the removal of hydrant flange F, such as during an auto accident, shear break ring S is shattered, leaving stored water pressure to drive the now freed cage 34 upwards and away from valve 12, ball valve element 32 (shown here as a solid material) being driven by the force of water. The ball valve element is guided by the vanes 30 upward until valve ball element 32 seals against circumferential upper valve seat 22, thus stopping water flow outward from the valve and the water supply system. When the hydrant is not being used as a water supply, ball valve element 32 descends to rest against seat 26. Also, ball valve element 32 is guided by vanes 28 and forced down against seat 26 when a water backpressure event occurs, thus acting as a check valve to avoid flow of contaminated water to the water system (see FIG. 5).

Figure 7:
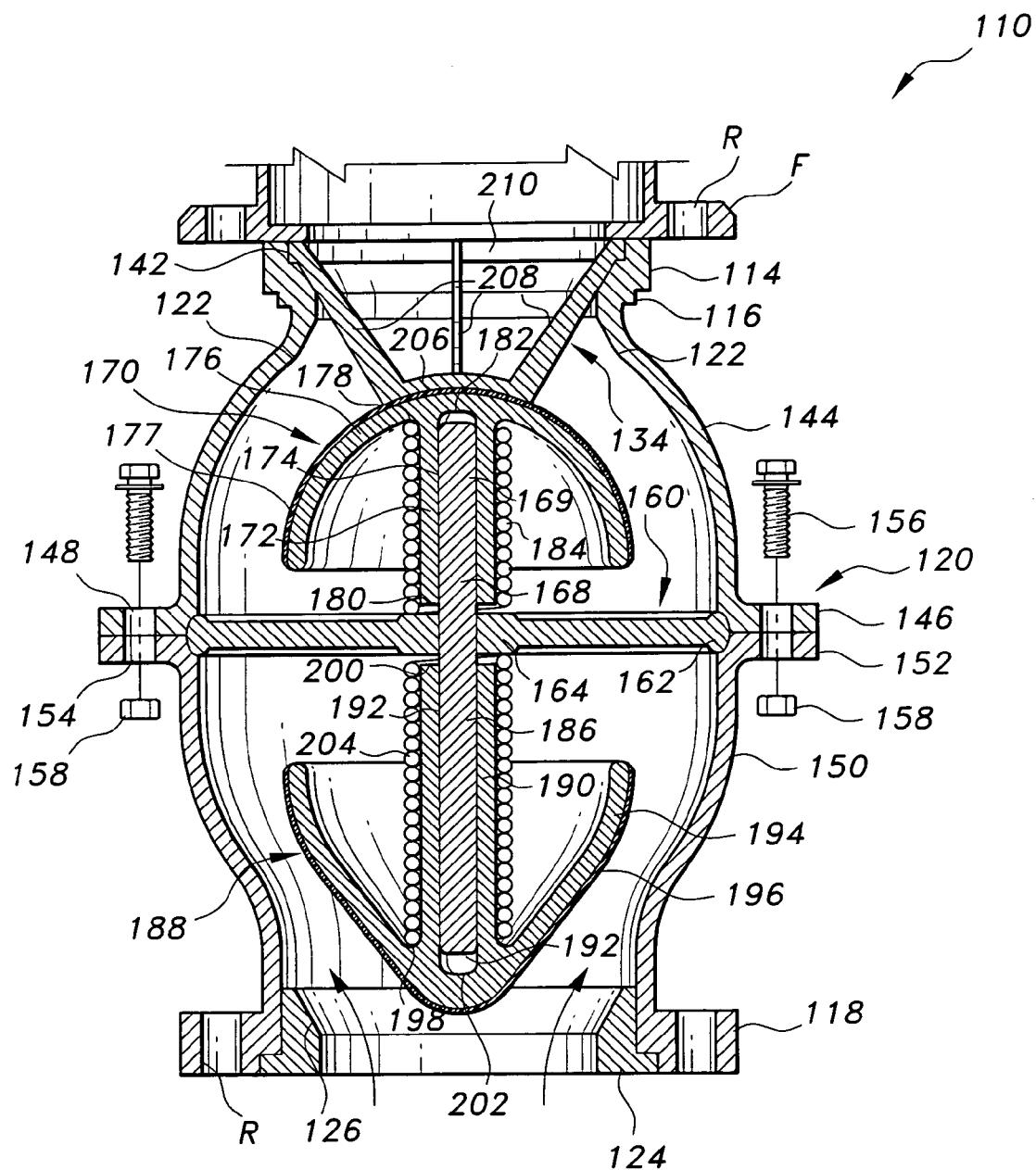
FIG. 7 is a section view of another embodiment similar to that of FIG. 3 having mushroom type valve elements.
Figure 8:
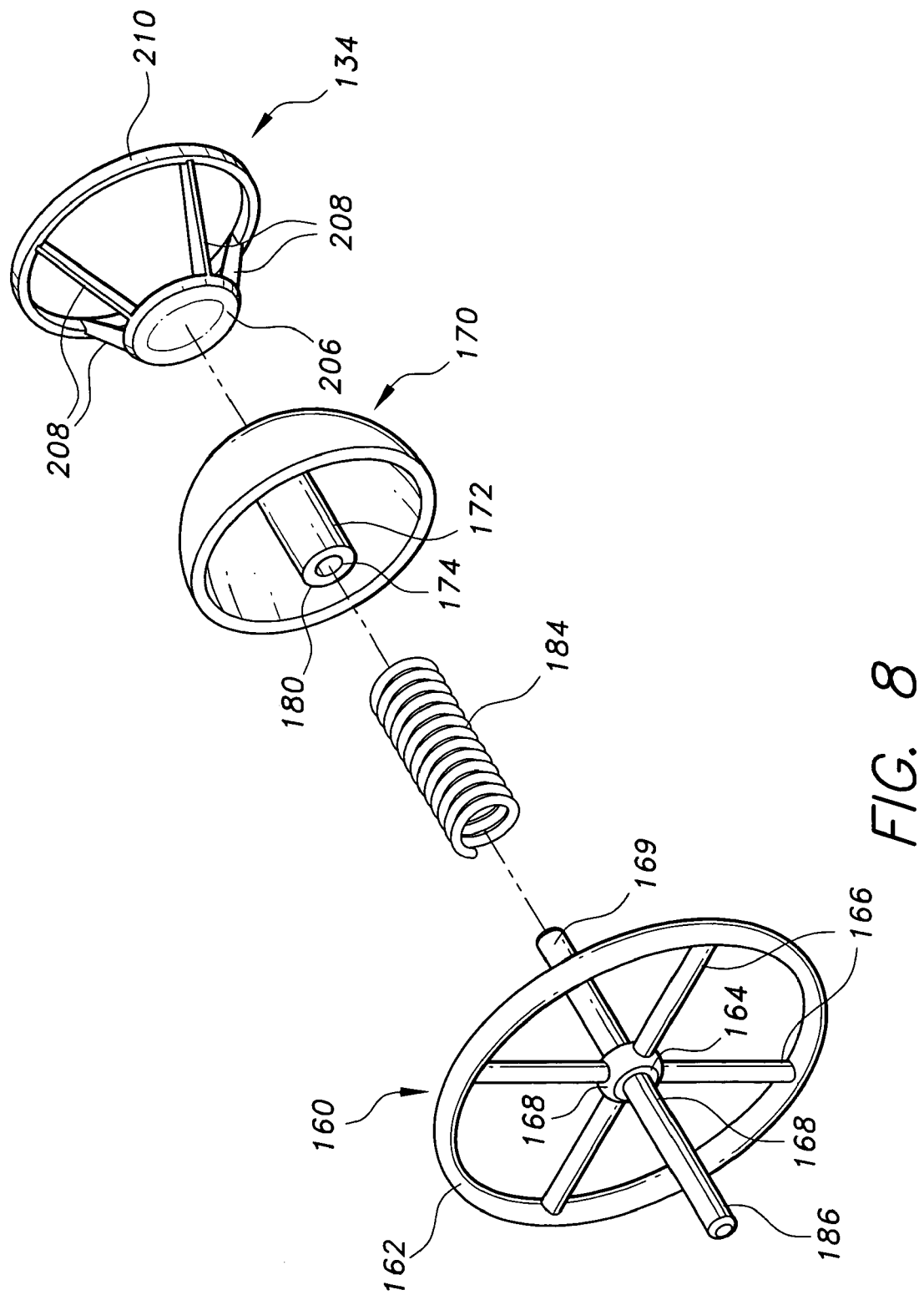
FIG. 8 is a partial exploded view of the upper mushroom type valve element and support of FIG. 7.

Referring to FIGS. 7–10, there are shown sectional views of another embodiment of the present invention, wherein the valve element is a double ended, spring-loaded, double mushroom shaped valve element supported axially by a support spider attached at the outer wall of the bulbous shaped wall. As seen in FIG. 7, valve 112 has a vertically oriented, generally cylindrical, bulbous outer wall 120 having an upper flange 114 defining a flange recess 116 for connection with hydrant flange F by means of a shear break ring S and bolts B through receiving bores R (see FIG. 2). Outer wall 120 forms a circumferential upper valve seat 122 at its upper neck. The lower end of outer wall 120 mates with a circumferential lower valve set ring 124 forming a lower valve seat 126 and held in place by the upper flange of riser R (see FIG. 2).

Outer wall 20 is radially split at its midsection, forming an upper generally hemispheric outer wall 144 having an outer wall lower flange 146. Lower flange 146 defines flange bores 148 for attachment to lower generally hemispheric outer wall 150 at lower hemispheric outer wall lower flange 152. Lower flange 152 has flange bores 154, the outer wall flange bores being aligned and secured by flange securing bolts 156 and securing nuts 158. A mushroom valve-restraining cage 134, similar or identical to that of the first embodiment (element no. 34), is located in the upper portion of valve 112. Restraining cage 134 is formed by a centrally located concave seat 206 having a surface shaped to conform to the upper hemispheric mushroom valve member 176 of mushroom valve 170 so as to restrain mushroom valve 170 from moving upward under coil spring force and during upward water flow to hydrant H during use.

Figure 9A:
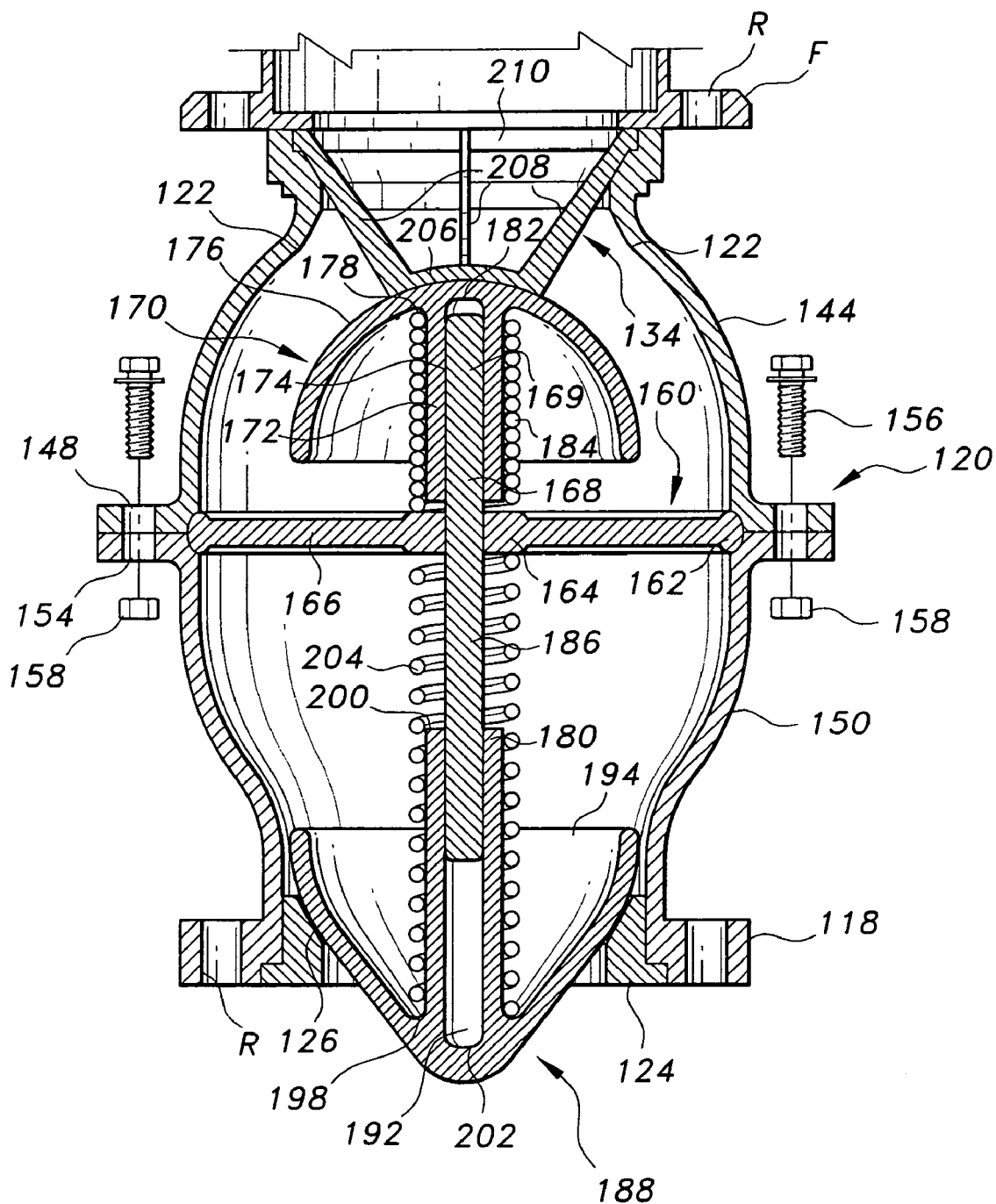
FIG. 9A is a section view similar to that of FIG. 6 with the mushroom type valve elements in steady state and backflow check position.
Figure 9B:
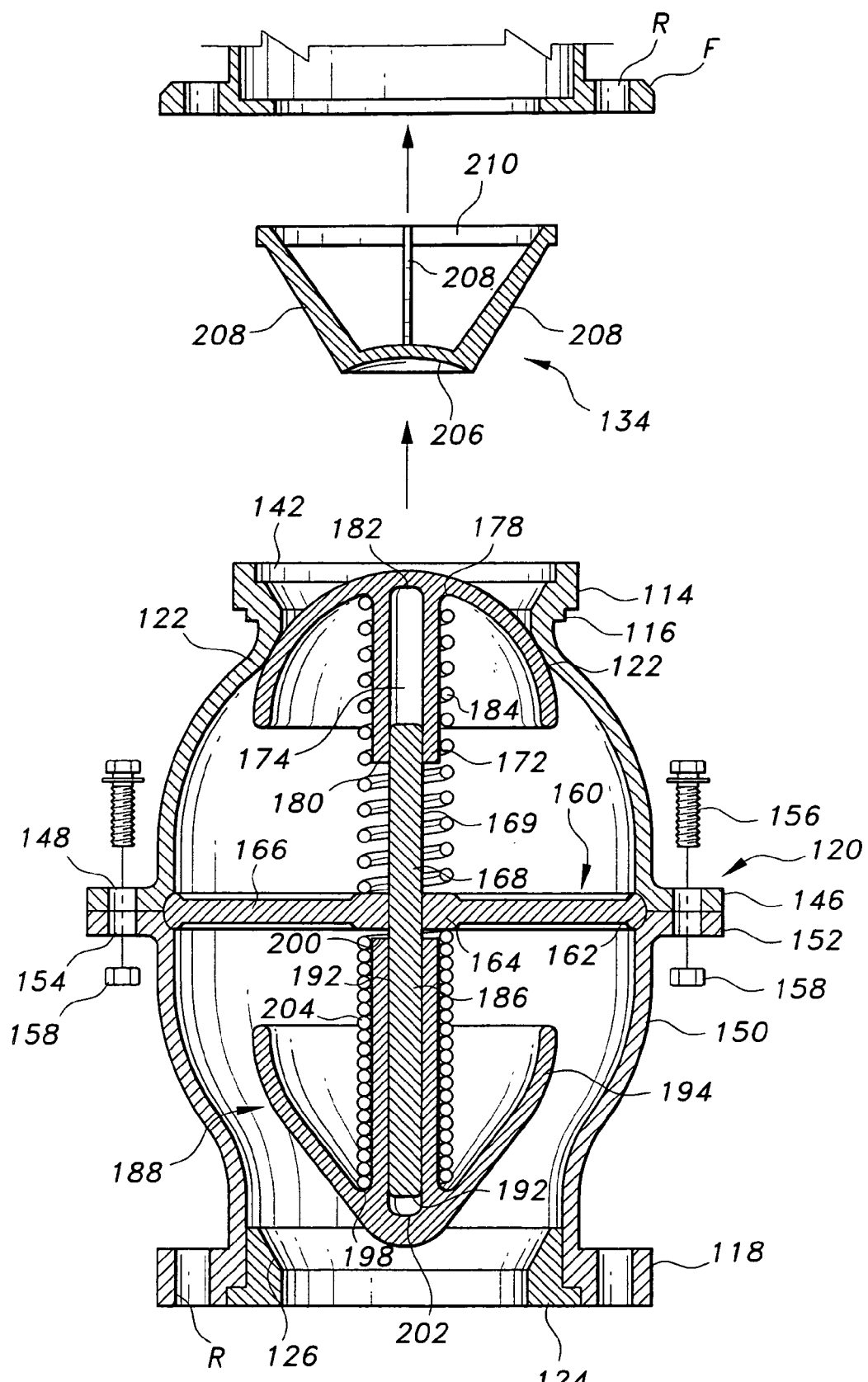
FIG. 9B is a partial exploded section view similar to that of FIG. 6 with the mushroom type valve elements in a stop flow position.

Cage 134 preferably has at least three cage legs 208 radiating upwardly and outwardly, joining with a circumferential cage retaining ring 210 which fits into an upward opening cage retaining ring groove 142 in the upper, inner side of valve upper flange 114. Cage 134 is held in place in groove 142 by flange F when hydrant H is in place. Cage legs 208 space cage mushroom seat 136 and, thereby, upper mushroom valve element 176 from upper seat 122, thus, allowing flow of water upward around mushroom valve element 170 and between the cage legs 208 to the hydrant H when water is supplied to hydrant H for supplying, for example, a fire hose. As illustrated in FIG. 9B, upon the removal of hydrant flange F, such as during an auto accident, shear break ring S is shattered, leaving stored water pressure to drive the now freed cage 134 upwards and away from valve 112, mushroom valve element 170 being driven by the force of the water and the coiled spring 184 (See description below).

A support spider 160 supports mushroom valve element 170 by support spider hub 164. Support spider hub 164 is connected to support spider outer rim 162 by support spider spokes 166 (See FIG. 8). Support spider outer rim 162 is held horizontal in the interior of valve 112 by corresponding inner half grooves at the intersection of outer wall flanges 146 and 152 at the split between upper hemispheric outer wall 144 and lower hemispheric outer wall 150. A vertical, axial support shaft 168 is supported by support spider hub 164 so as to form an upper portion 169 and a support shaft lower portion 186 of equal lengths. Upper hemispheric mushroom valve member 176 is centrally supported by an upper axial support shaft cylinder stem or engaging portion 172 integral with the hemispheric portion of mushroom valve member 176 and includes an axial recess 174 extending its substantial length for slidingly receiving the vertical axial support shaft 168. As shown in FIG. 7, a relatively soft, plastic layer 177 may be installed to cover the upper surface of upper mushroom valve member 175 to provide a tight seal with upper valve seat 122.

An upper closure coil spring 184 surrounds and is coaxial with upper axial support shaft cylindrical engaging portion or stem 172 and remains in a compressed state between the upper, inner end 178 of engaging portion 172 and the upper side of support spider hub 164, the lower end 180 of engaging portion 172 being even with or spaced above support spider hub 164.

Vertical, axial support shaft 168, as supported by support spider hub 164, forms a lower portion 186. Lower mushroom valve element 188 is in the general form of an inverted mushroom having a lower mushroom valve member 194 and a centrally disposed lower axial support shaft cylindrical engaging portion or stem 190 extending upward therefrom and slidingly engaged with support shaft lower portion 186 within axial recess 192. The lower mushroom valve member may have a soft plastic valve sealing layer 196 (as seen in FIG. 7) on its lower sealing surface for engaging lower circumferential valve seat 126 located on the upper inner side of lower valve seat ring 124.

Lower closure coil spring 204 surrounds and extends the length of the engaging portion lower inner end 198 and the lower side of support spider hub 164, coil spring 206 being in a partially compressed condition (See FIG. 7). The upper end 200 of lower engaging portion 190 is even with or spaced below the lower surface of support spider hub 164. Coil spring 204 urges lower mushroom valve element 188 downward against lower seal 126 (see FIG. 9A) when no water is flowing from hydrant H, but opens with the force of system water pressure to the configuration of FIG. 7. Also, lower mushroom valve 188 closes under a backpressure condition, preventing backflow into the riser R and into the water system, thus, avoiding contamination of system water.

As illustrated in FIG. 9B, upon the removal of hydrant flange F, such as during an auto accident, shear break ring S is shattered, leaving stored water pressure to drive the now freed cage 134 upwards and away from valve 112, upper mushroom valve 170 being driven by the force of the water and upper coil spring 184. The upper mushroom valve is guided upwards by upper support shaft portion 169 until it seals against upper valve seat 122, thus, stopping water flow outward from the valve and the water supply system. When the hydrant H is not being used as a water supply, lower mushroom valve element 188 is forced down against seat 126 by pressure from the coil spring 204 and guided by support shaft lower portion 186 within axial recess 192. Backpressure also allows the closure of valve 188, thus preventing backflow of contaminated water into the system water supply through riser R.

Figure 10:
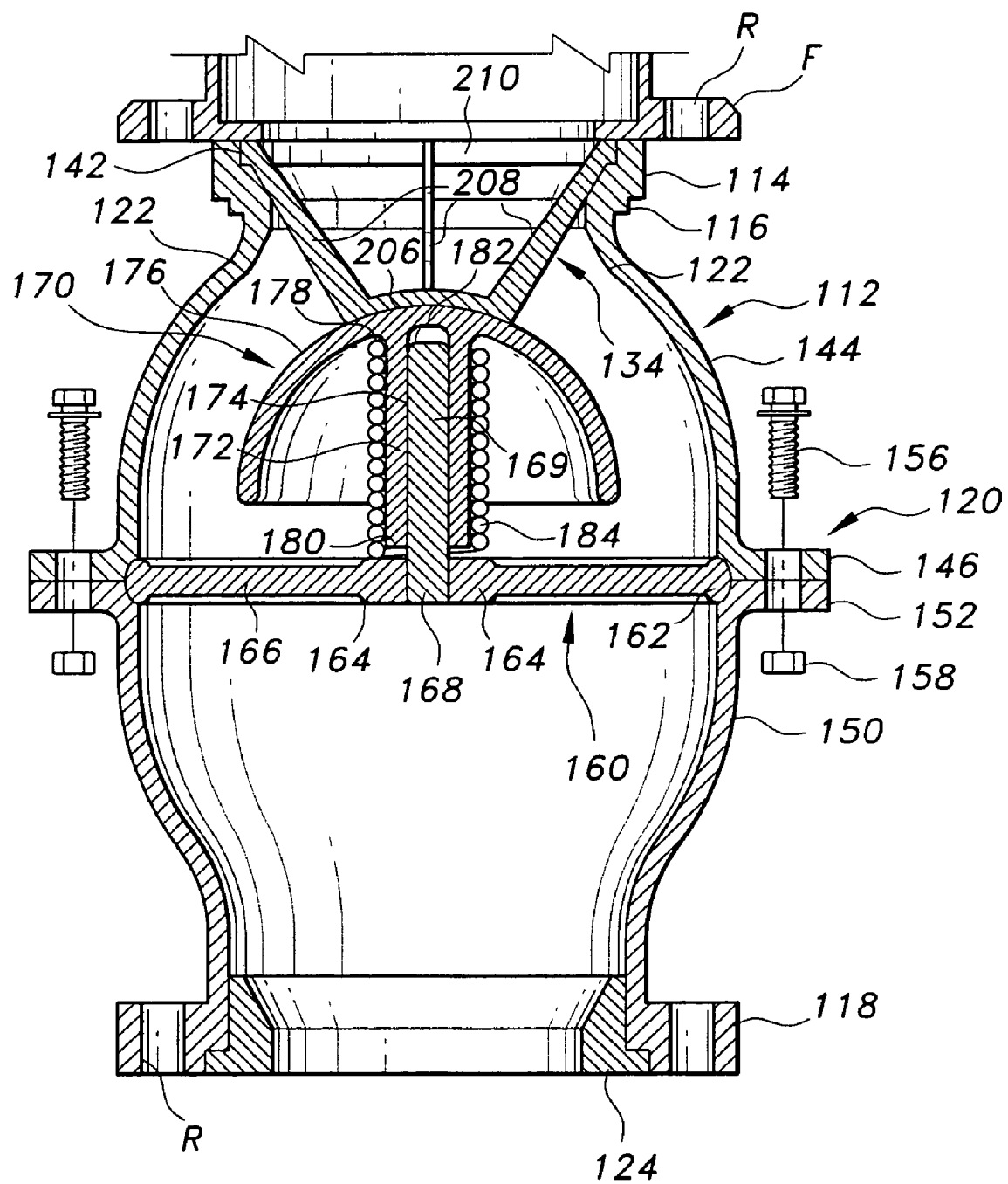
FIG. 10 is a section view similar to that of FIG. 6 with only an upper stop flow valve element in steady state position.

Referring to FIG. 10, there is shown a sectional view of a flow stop valve identical to that of FIG. 7 described above, however, all structure related to the lower mushroom check valve is deleted. In this version of the embodiment of FIG. 7, the valve 112 has only the stop flow capability associated with the knocking off of hydrant H, the removal by water flow pressure of cage 134, and the sealing of mushroom valve 170 against circumferential upper valve seat 122, thus, stopping system water loss.

Figure 11:
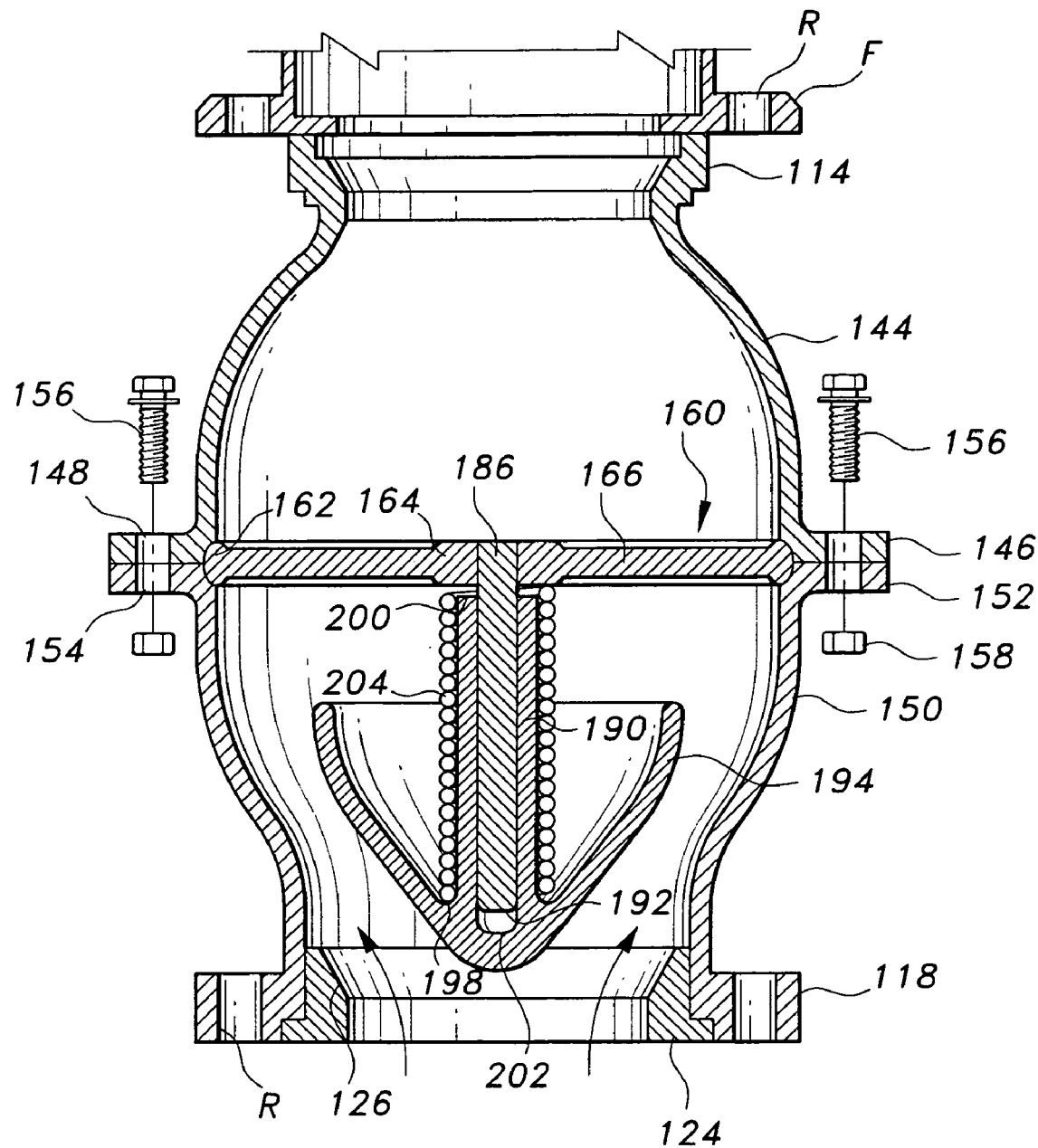
FIG. 11 is a section view similar to that of FIG. 6 with only a lower valve element which is shown in a flow position.

Referring to FIG. 11, there is shown a sectional view of a backflow check valve identical to that of FIG. 7 described above, however, all structure related to the upper mushroom flow stop valve is deleted. In this version of the embodiment of FIG. 7, the valve 112 has only the backflow check capability associated with a water backpressure event in which the sealing of mushroom valve 194 against lower seat 126 is accomplished under spring pressure as urged by coil spring 204.

Figure 12:
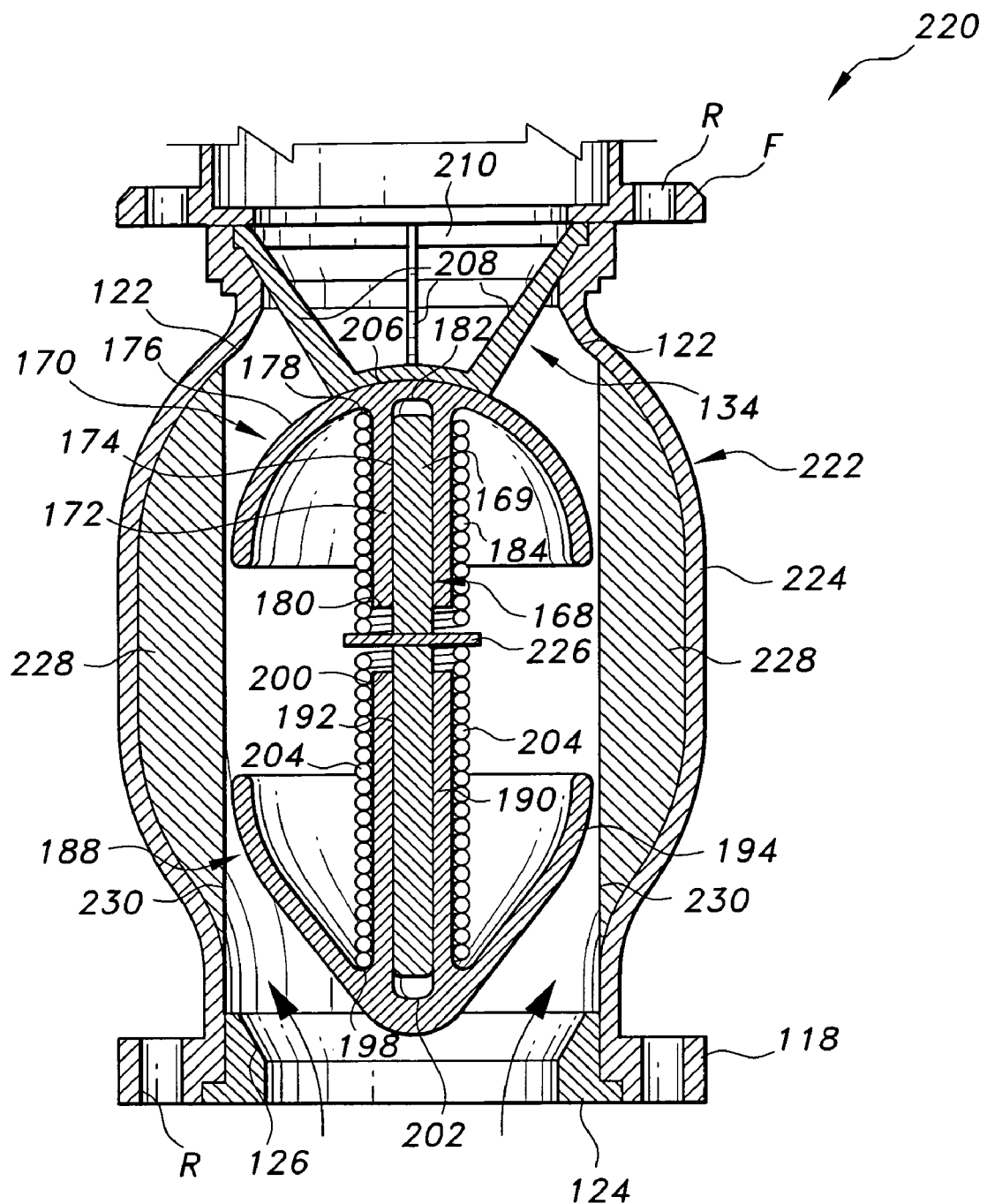
FIG. 12 is a section view of another embodiment similar to that of FIG. 6 shown in a flow position.
Figure 13:
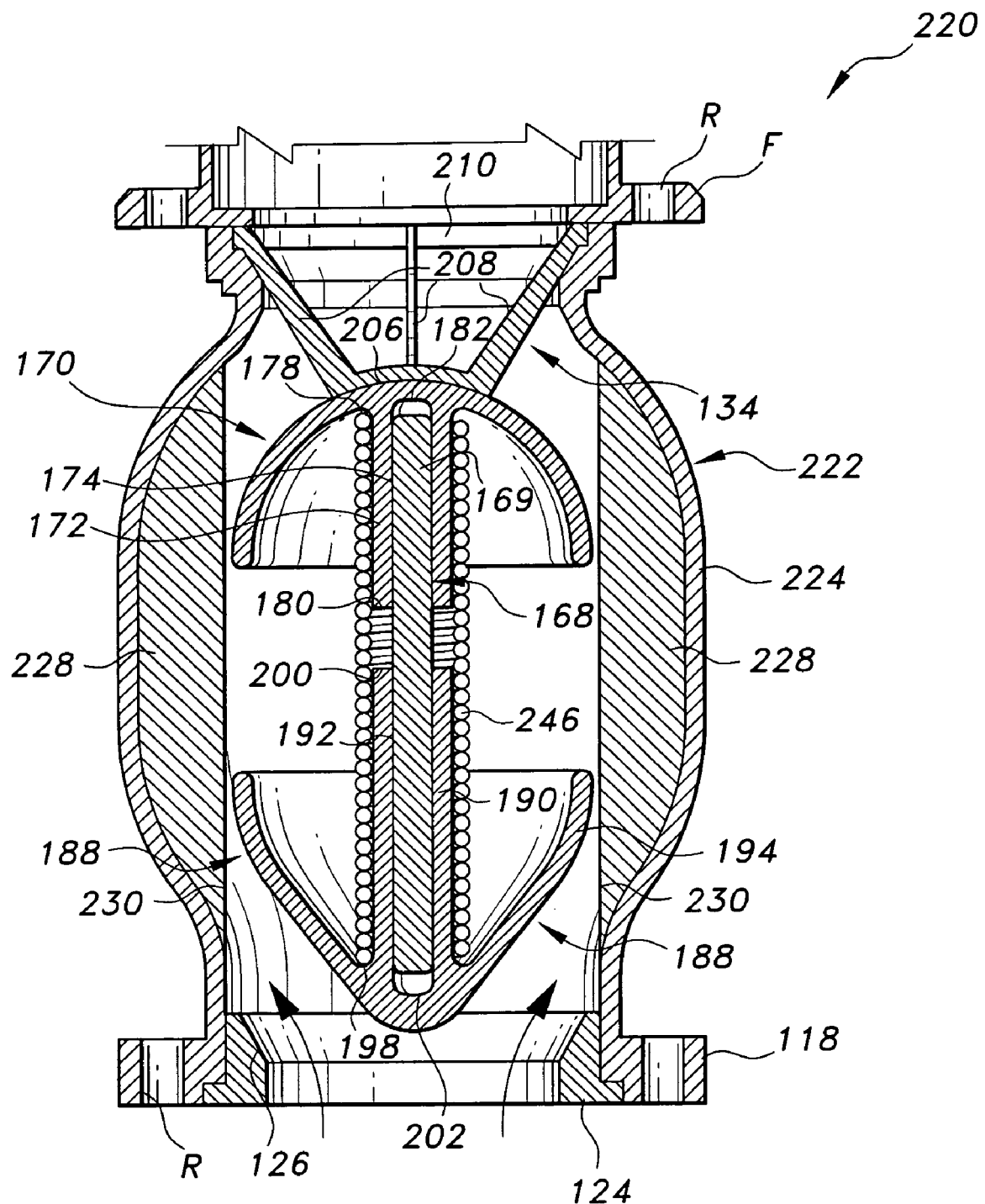
FIG. 13 is a section view of another embodiment similar to that of FIG. 2 shown in a flow position.

Referring to FIGS. 12 and 13, there is shown a section view of another embodiment of the present invention wherein an elongated version of the valve outer wall and vanes is provided with a double mushroom type valve element which is free to travel in the cylindrical space defined by the vanes. More particularly, vane guided mushroom valve shutoff system 220 has an oblong cylindrical bulbous outer wall 222 having an upper flange 14 having a flange recess 16 (See FIG. 1) for connection with a hydrant flange F as previously discussed above. The lower end of outer wall 222 mates with a circumferential lower valve seat ring 124, forming a lower valve seat 126. Vanes 228 extend radially inward from the bulbous portion of outer wall 222 and extend vertically so as to form a cylindrical vertical valve member guide defined by vertical vane valve guides 230. There are preferably four vanes 228 in valve 220, but three or more vanes may be provided as desired. The bulbous shape of the outer wall provides passageways for water flow between vanes 228.

The upper mushroom valve element 170 is identical to that of FIG. 7, as well as the cage 134 and upper seat 122 and upper flange features. The lower mushroom valve element 188 is identical to that of FIG. 7, as well as the lower flange 118, seat ring 124 and valve seat 126. A washer-like separation plate 226 is fixed midway along vertical axial support shaft 168 as by welding, separating upper coil spring 184 from lower coil spring 204. As shown, water is flowing upward through valve 220 to hydrant H and the water flow and coil spring pressure has forced upper mushroom valve 170 upward against cage seat 206. The knockoff of hydrant H and flange F results in the release of cage 134 and the sealing of upper mushroom valve 170 against seal 122 by upper coil spring 184 acting against separation plate 226, resulting in the stoppage of water flow out the valve.

The shutoff of water at hydrant H stops flow and allows lower coil spring 204 to act against separation plate 226, forcing lower mushroom valve 188 to seat against lower valve seat 126. Also, backpressure from the hydrant H initiating backflow through valve 220 results in the closing of lower mushroom valve 188, thereby preventing contamination of the water system.

Referring to FIG. 13, there is shown a section view of a variation on the embodiment of valve 20 of FIG. 13, where no separation plate 226 is attached to axial support shaft 168 and a single coil spring 246 is employed between the engaging portion upper end 178 of upper mushroom valve 170 and the engaging portion lower end 198 of lower mushroom valve 188. In this embodiment, during periods of no water flow the coil spring 246 forces upper mushroom valve 170 against cage seat 206 and lower mushroom valve 188 against valve seat 126. This embodiment will operate as a stop flow valve upon loss of the hydrant H, and as a backflow check valve upon the development of water backpressure in the hydrant H or valve 220.

The above-described embodiments of the invention are typically constructed of cast iron and steel, however, other suitable materials are contemplated in the construction of the various embodiments.

It is to be understood that the present invention is not limited to the embodiments described above, but encompasses any and all embodiments within the scope of the following claims.

I claim:

1. A hydrant knock-off flow stop valve comprising:
   a generally cylindrical, vertically oriented, bulbous wall defining a central, vertical axis;
   an upper flange having circumferential recess so located as to receive a break ring for breakaway attachment of the lower flange of a wet hydrant;
   a lower flange for connection with a fluid system supply riser;
   a plurality of vertically disposed, circumferentially spaced vanes extending radially inward from said bulbous wall, said vanes having inner edges defining vertically oriented guides, said guides defining a generally cylindrical valve member guide;
   said bulbous wall forming a circumferential upper valve seat spaced below said upper flange along the interior wall thereof;
   a valve element free for vertical movement within said generally cylindrical valve member guide and so configured as to seal against said upper valve seat, closing upward flow of fluid through said valve; and
   a valve element restraining cage located in the upper portion of said valve, said cage having a centrally located valve member seat, a circumferential cage retaining ring spaced upward from said valve member seat, and a plurality of radially spaced cage legs extending between said valve member seat and said cage retaining ring;
   said upper flange defining an inner upward-opening cage retaining ring groove;
   said valve element restraining cage having said circumferential cage retaining ring removably located within said upward-opening cage retaining ring groove, said valve member seat being spaced below said upper circumferential seat by said plurality of spaced cage legs;
   whereby, system water flows through the riser, upward between said vanes, through said cage legs, and through said upper flange for supply of water to the wet hydrant; and
   whereby, upon the hydrant being accidentally impacted such that the break ring shears, water pressure acts upon said valve element, driving said cage upward, away from said valve and allowing said valve element to travel upward to said upper circumferential seat, forming a seal therewith and stopping water flow through said valve.

2. The valve of claim 1, further comprising a circumferential lower valve seat ring mounted on the inner circumference of said lower valve flange and defining a circumferential lower valve seat at the upper end thereof;

whereby, upon a backpressure event occurring in said valve, said valve element engages said lower seal by action of gravity and fluid pressure, acting as a check valve against backflow of fluid into the riser and supply system.

3. The valve of claim 1, wherein the inner side of said upper flange slopes upward and outward, and said cage legs extend upward and outward from said valve element seat and fit against and are partially supported by the inner side of said upper flange.

4. The valve of claim 3, wherein said valve element restraining cage restraining ring is held in place by said hydrant flange and said valve element restraining cage restraining ring is freed upon separation of said hydrant from said valve upper flange, allowing said restraining cage to separate from said valve, allowing said valve element to lift and stop fluid flow.

5. The valve of claim 1, wherein said valve element is in the form of a ball or globe.

6. The valve of claim 5, wherein said valve element is a hollow sphere having a covering of a soft plastic layer.

7. The valve of claim 6, wherein said valve element is made of cast iron.

8. The valve of claim 1, wherein said valve element comprises:

a double ended valve element having upper and lower mushroom elements, having an upper, mushroom shaped upper surface and a lower, inverted mushroom shape lower surface, respectively, each of said upper and lower mushroom shape elements having supporting stems having respective mushroom inner ends and free ends and defining axial recesses extending along their respective lengths, a common, vertical axial support shaft having a separation plate mounted along the length thereof at about the longitudinal center, said supporting stems being slidingly mounted over said common vertical axial support shaft and toward said separation plate; and coaxial coil springs extending from said separation plate to the respective inner ends of said stems;

whereby upon said hydrant if broken away at its lower flange by the shearing of said break ring, and the separation of said support cage, said upper mushroom element is forced upward under spring pressure to seal against said upper circumferential upper seal.

9. The valve of claim 2, wherein said valve element comprises:

a double ended, upper and lower double mushroom elements, having an upper, mushroom shape upper surface and a lower, inverted mushroom shape lower surface, each said upper and lower mushroom shape elements having supporting stems having respective mushroom inner ends and free ends and defining axial recesses extending along their respective lengths, a common, vertical axial support shaft longitudinal center, said supporting stems slidingly mounted through their respective free ends over said common vertical axial support shaft; and a coaxial coil spring extending coaxially over said stems between said mushroom element inner ends;

whereby, upon said hydrant being broken away at its lower flange by the shearing of said break ring, and the separation of said support cage, said upper mushroom element is forced by spring pressure to seal against said upper circumferential upper seal.

10. The valve of claim 8, further comprising a circumferential lower valve seat ring mounted on the inner circumference of said lower valve flange and defining a circumferential lower valve seat at the upper end thereof;

whereby, upon a backpressure event occurring within said valve, said valve element engages said lower seal by action of spring and fluid pressure, said valve acting as a check valve against backflow of fluid into the riser and supply system.

11. The valve of claim 9, further comprising a circumferential lower valve seat ring mounted on the inner circumference of said lower valve flange and defining a circumferential lower valve seat at the upper end thereof;

whereby, upon a backpressure event occurring within said valve, said valve element engages said lower seal by action of spring pressure and fluid pressure, acting as a check valve against backflow of fluid into the riser and supply system.

12. A hydrant knock-off flow stop valve comprising:

a generally cylindrical, vertically oriented, bulbous wall defining an central, vertical axis;

an upper flange having a circumferential recess so located as to receive a break ring for breakaway attachment to the lower flange of a wet hydrant;

a lower flange for connection with a fluid system supply riser;

said bulbous wall being split at its midsection into upper and lower generally hemispheric outer walls having engaging flanges;

a valve element support spider having an axially located hub, an outer circular rim, and a plurality of spider spokes extending between said hub and said rim and spaced radially therearound;

said outer wall engaging flanges forming corresponding inner half-grooves at their intersection, said outer circular rim being supported within the groove formed by said half-grooves when said flanges are mated;

a vertical, axial support shaft supported by and extending axially at least upward from said axially located hub, forming an upper portion thereof;

said valve element comprising a first upper mushroom valve element, said upper mushroom valve element having a mushroom shaped, generally hemispheric, upper surface and having a downward extending supporting stem having an inner end and a free end and defining an axial recess therein, said free end extending over and slidingly engaging said upper portion of said axial support shaft, said upper mushroom valve element having a coil spring surrounding said stem from said inner end to said support spider hub;

said upper hemispheric wall forming a circumferential upper valve seat spaced below said upper flange along the interior wall thereof, said valve seat forming a seal upon engaging said mushroom shaped upper surface of said upper valve element so as to stop fluid flowing upward through said valve; and a valve element restraining cage located in the upper portion of said valve, said cage having a centrally located valve member seat, a circumferential cage retaining ring spaced upward from said valve member seat, and a plurality of radially spaced cage legs extending between said valve member seat and said cage retaining ring;

said upper flange defining an inner upward-opening cage retaining ring groove;

said valve element restraining cage having said circumferential cage retaining ring removably located within said upward-opening cage retaining ring groove, said valve member seat being spaced below said upper circumferential seat by said plurality of spaced cage legs; and said upper mushroom valve being driven by spring pressure and fluid pressure against said upper seal upon said hydrant flange breaking away and said restraining cage lifting from said upper flange by fluid and spring pressure;

whereby, system water flows through the riser, upward between said vanes, through said cage legs, and through said upper flange for supply of water to the wet hydrant; and whereby, upon the hydrant being accidentally impacted such that the break ring shears, fluid and spring pressure acts upon said valve element, driving said cage upward, away from said valve and allowing said valve element to travel upward to said upper circumferential seat, forming a seal therewith and stopping water flow through said valve.

13. The valve of claim 12, said axial support shaft extending axially below said axial support spider hub, said valve element comprising a second, lower inverted mushroom valve element, said lower mushroom valve element having a mushroom shaped, generally hemispheric, lower surface and having an upward extending supporting stem having an inner end and a free end and defining an axial recess therein, said free end extending over and slidingly engaging said lower portion of said axial support shaft, said lower mushroom valve element having a coil spring surrounding said stem from said inner end to said support spider hub;

said lower flange of said valve having a circumferential lower valve seat ring mounted on the inner circumference of said lower valve flange and defining a circumferential lower valve seat at the upper end thereof, said lower seat sealing against flow of fluid upon said lower mushroom valve element surface engaging said lower seat;

whereby, upon a backpressure event occurring within said valve, said valve element engages said lower seal by action of spring and fluid pressure, the valve acting as a check valve against backflow of fluid into the riser and supply system.

14. The valve of claim 12, wherein the inner side of said upper flange slopes upward and outward, and said cage legs extend upward and outward from said valve element seat and fit against and are partially supported by the inner side of said upper flange.

15. The valve of claim 14, wherein said valve element restraining cage restraining ring is held in place by said hydrant flange and said valve element restraining cage restraining ring is freed upon separation of said hydrant from said valve upper flange, allowing said restraining cage to separate from said valve, and allowing said valve element to lift and stop fluid flow.

16. The valve of claim 12, wherein said upper mushroom surface is covered with soft plastic layer.

17. The valve of claim 13, wherein said lower mushroom surface is covered with a soft plastic layer.

18. The valve of claim 13, wherein the inner side of said upper flange slopes upward and outward, and said cage legs extend upward and outward from said valve element seat and fit against and are partially supported by the inner side of said upper flange.

19. The valve of claim 18, wherein said valve element restraining cage restraining ring is held in place by said hydrant flange and said valve element restraining cage restraining ring is freed upon separation of said hydrant from said valve upper flange, allowing said restraining cage to separate from said valve, allowing said valve element to lift under spring pressure and stop fluid flow.

* * * * *